(No Model.) 3 Sheets—Sheet 1.
B. F. MARTINDALE.
BALING PRESS.
No. 573,023. Patented Dec. 15, 1896.
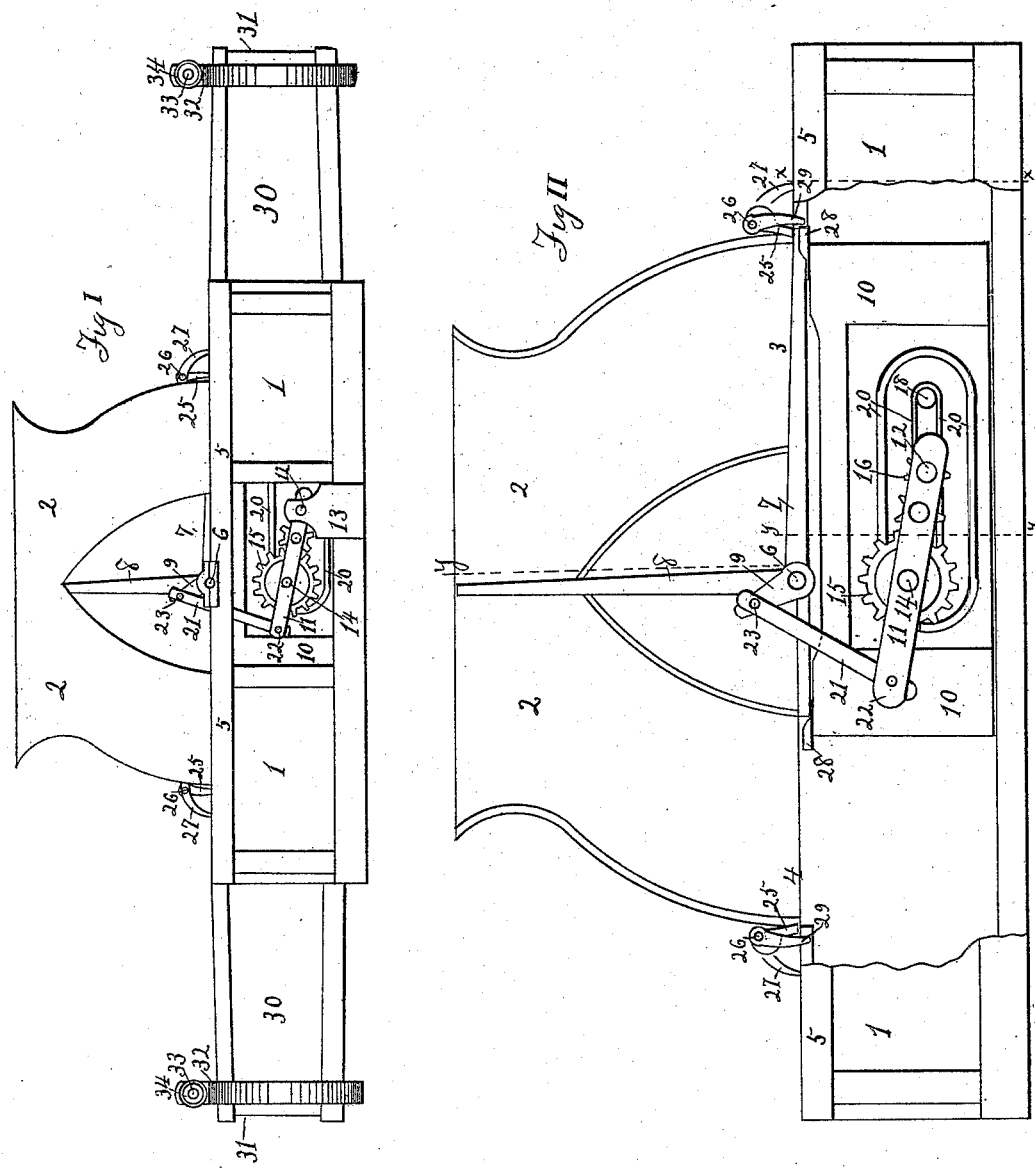
Witnesses
Benj. S. Brown.
A. L. Brown.
Inventor
B. F. Martindale
by J. S. Brown
Attorney (No Model.) 3 Sheets—Sheet 2.
B. F. MARTINDALE.
BALING PRESS.
No. 573,023. Patented Dec. 15, 1896.
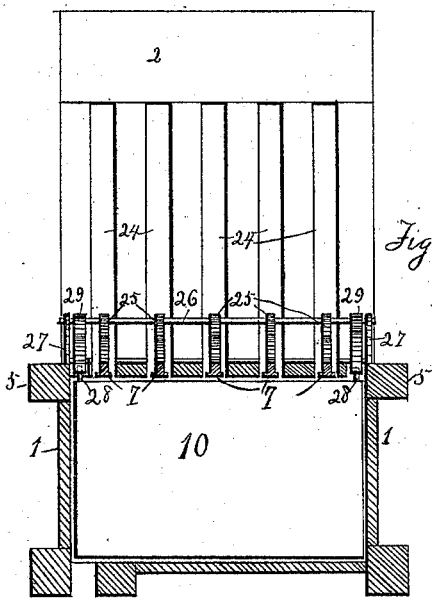
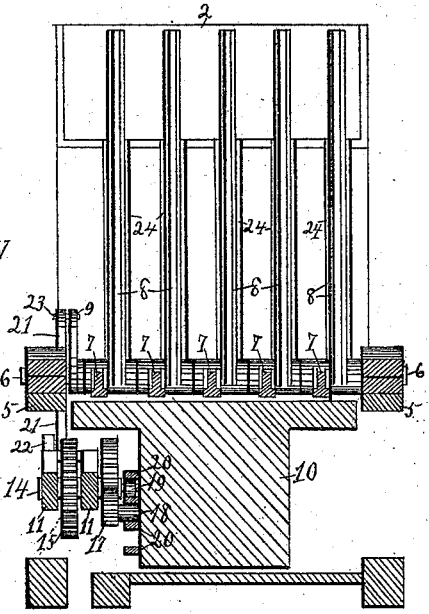
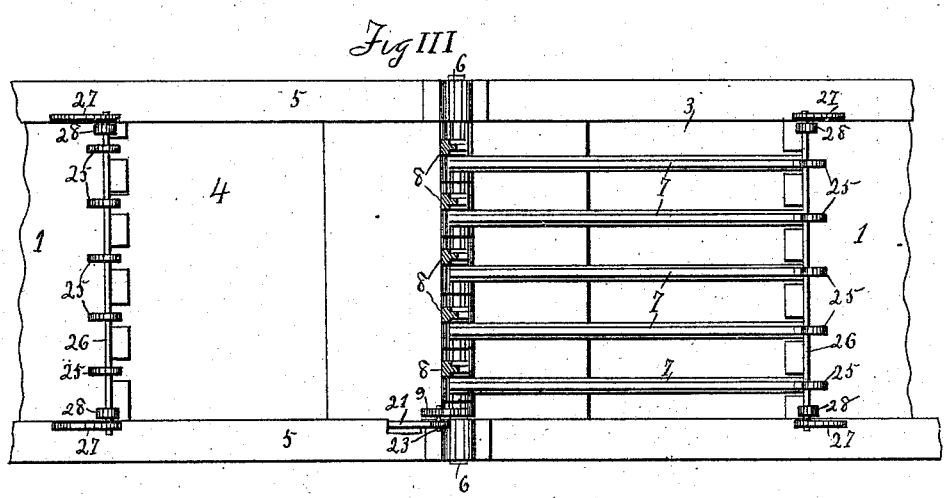

(No Model.) 3 Sheets—Sheet 3.
B. F. MARTINDALE.
BALING PRESS.
No. 573,023. Patented Dec. 15, 1896.
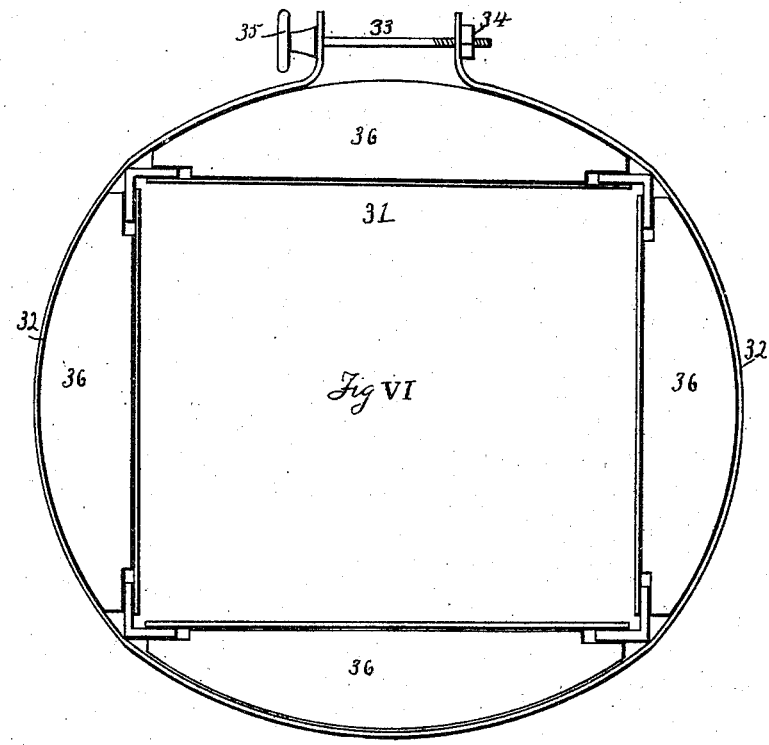
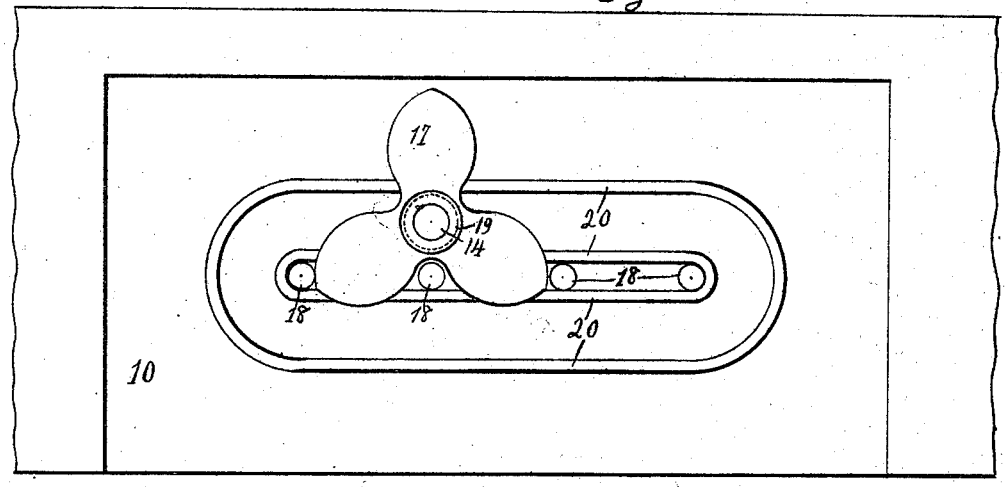
Witnesses
Benj. S. Brown
A. C. Brown
Inventor
B. F. Martindale
by J. S. Brown
Attorney

UNITED STATES PATENT OFFICE.

BENJAMIN FRANKLIN MARTINDALE, OF WICHITA, KANSAS, ASSIGNOR OF ONE-THIRD TO EDWIN R. MEAD AND EDWARD E. HALE, OF FORT SCOTT, KANSAS.

BALING-PRESS.

SPECIFICATION forming part of Letters Patent No. 573,023, dated December 15, 1896.

Application filed April 6, 1896. Serial No. 586,365. (No model.)

*To all whom it may concern:*

Be it known that I, BENJAMIN FRANKLIN MARTINDALE, of Wichita, in the county of Sedgwick, in the State of Kansas, have invented certain new and useful Improvements in Baling-Presses, of which the following is a full, clear, and exact description, reference being had to the accompanying drawings, which form a part of this specification.

My invention relates to improvements in baling-presses adapted to use in baling hay, straw, and other like material; and my invention consists in certain features of novelty hereinafter described, and pointed out in the claims.

Figure I represents a side elevation of a baling-press embodying my improvements. Fig. II represents a side elevation of the baling-chamber and feed-chamber with part of the frame removed. Fig. III represents a plan view of part of the baling-chamber, the feed-chamber being removed. Fig. IV represents a cross-section on the line $x\ x$ of Fig. II. Fig. V represents a cross-section on the line $y\ y$ of Fig. II. Fig. VI represents an end view of the expansible end of the delivery portion of the press. Fig. VII represents a detail side elevation of a part of the traverser, showing the operating mechanism.

Similar numerals refer to similar parts throughout the several views.

1 represents the baling-chamber of the press.

2 represents the feed chamber or hopper, communicating with the baling-chamber toward each end thereof through the feed-openings 3 and 4, as shown in Figs. II and III.

Upon the top stringers 5 of the baling-chamber is journaled the rocking shaft 6, upon which are secured the series of rocking feeding-arms 7 and 8. Said rocking shaft is also provided with the crank-arm 9.

10 represents the traverser, adapted by the mechanism now to be described to act alternately in the opposite ends of the baling-chamber, the same being a modification and improvement of the mechanism shown and described in an application for Letters Patent filed by myself and one F. D. Moore, March 24, 1896, Serial No. 505,226, and consisting of the bearing-block 11, pivotally mounted near one end on the shaft 12, journaled in the brackets 13, supported on the frame. In said bearing-block is journaled the shaft 14, carrying the drive-wheel 15, operated through an idler-pinion by the drive-pinion 16 on the shaft 12. On said shaft 14 is also mounted the cam-leafed pinion 17, adapted to engage and operate upon the studs 18, securely fixed in the body of the traverser. (Shown in detail in Fig. VII.) On said shaft 14 is also loosely mounted the wrist-roller 19, adapted to travel between the guides 20, controlling the rise and fall of the bearing-block at the end of the stroke and determining the path and operative relation of the cam-leafed pinion to the studs, said pinion when operating above the studs carrying the traverser in one direction and below the studs in the opposite direction.

21 represents a pitman mounted at one end upon an extension 22 of the bearing-block and at the other end connected with the wrist-pin 23 in the crank-arm 9, so that with the rise and fall of the bearing-block at the end of the stroke said rock-shaft 6 will be operated, operating the feeding-arms 7 and 8 to carry the material alternately down through the feed-openings 3 and 4, said feeding-arms in their movement operating in the slots 24 in the casing of the feeding-chamber. As said feeding-arms 7 operate to carry the material down into the baling-chamber they impinge at their ends against the detents 25, carried on the rock-shaft 26, mounted in the brackets 27, rocking the same outward until as said arms reach the limit of their downward movement said detents are released and by their own weight swing back over the ends of said arms, retaining them in a fixed relation, as shown in Fig. II, as the traverser moves forward, during which time the feeding-arms 8 are in a substantially perpendicular position, as shown, permitting the material to be fed into the other side of the feed-chamber over the feed-opening 4. As the traverser nears the end of its stroke the lug 28 on the traverser engages the trip-lever arm 29, secured to the rock-shaft 26, operating the detents and releasing said feeding-arms, when as the bearing-block with the traverser-actuating mechanism falls at the end of the stroke said feeding-arms 7, being free, are raised through the action of the pitman 21, the feeding-arms 8 by such action being carried down, carrying the material through the feed-opening 4 and engaging the detents, as above described, for the feed-arms 7, said feeding-arms 7 and 8 thus acting alternately with the rise and fall of the bearing-block.

30 represents the delivery portion of the press, having the expansible end 31, provided with the spring-band 32, encircling said end, having its ends connected by the tension-rod 33, provided with the nut 34, and operated by the hand-wheel 35, whereby the tension upon and compression of the bale is regulated and controlled.

36 represents blocks interposed between said spring and the sides of said end to secure an even pressure upon all sides.

Having thus fully described my improvements, what I claim as my invention, and desire to secure by Letters Patent, is—

1. In a baling-press the combination with a baling-chamber and a reciprocating traverser operating therein, of a feed-chamber communicating with the baling-chamber in the path of the traverser, rocking arms operating in said feed-chamber to carry the material therefrom into the baling-chamber, a rock-shaft on which said arms are mounted, a crank-arm mounted on said shaft, a pitman connected to said crank-arm, a rocking bearing-block mounted on a shaft journaled on the press-frame to which said pitman is connected, a drive-wheel mounted on a shaft journaled in said bearing-block, a cam-leafed pinion mounted on said shaft, studs fixed in the traverser with which said pinion engages, a guideway on the traverser around said studs, and a wrist-roller on the shaft of said drive-wheel adapted to travel in said guideway, substantially as and for the purpose set forth.

2. In a baling-press the combination with a baling-chamber and a reciprocating traverser operating therein, of a feed-chamber communicating with the baling-chamber in the path of the traverser, a rock-shaft journaled on the press-frame, rocking arms mounted on said shaft, a crank-arm on said shaft, a pitman connected with said crank-arm for operating said rocking arms, detents mounted on a rocking shaft journaled in brackets supported on the press-frame, a trip-lever mounted on said shaft and a lug on the traverser adapted to engage said trip-lever, substantially as and for the purposes set forth.

3. In a baling-press having a suitable baling-chamber, the combination with a feed-chamber communicating with the baling-chamber, and rocking arms operating in said feed-chamber, of detents mounted on a rock-shaft journaled in brackets on the press-frame adapted at certain times to engage said rocking arms, and a trip-lever on said shaft for actuating said detents to release said rocking arms from engagement therewith, substantially as set forth.

4. In a baling-press the combination with a baling-chamber, a reciprocating traverser operating therein and the traverser-reciprocating mechanism, of a feed-chamber communicating with the baling-chamber in the path of the traverser, a rock-shaft journaled on the press-frame, rocking arms mounted on said shaft operating in said feed-chamber, a crank-arm on said shaft, a pitman connected with said crank-arm, and a rocking bearing-block mounted on a shaft journaled on the press-frame in which is mounted the traverser-reciprocating mechanism and to which said pitman is connected, so that as the traverser is reciprocated said rocking arms will be operated, substantially as set forth.

5. In a baling-press the combination with a baling-chamber and a reciprocating traverser operating therein, of a rocking bearing-block mounted on a shaft journaled on the press-frame, a drive-wheel mounted on a shaft journaled in said bearing-block, a cam-leafed pinion mounted on said drive-wheel shaft, studs mounted on the traverser with which said pinion engages, guides on the traverser forming a guideway around said studs, a wrist-roller on said drive-wheel shaft traveling in said guideway, and suitable gearing for actuating said drive-wheel, substantially as and for the purposes set forth.

6. In a baling-press the combination with a suitable baling-chamber, a reciprocating traverser operating therein and a rocking bearing-block in which is mounted the traverser-actuating mechanism, of a feed-chamber provided with a feed-opening communicating with said baling-chamber in the path of the traverser, rocking feed-arms operating in said feed-chamber, and a rock-shaft on which said arms are mounted connected with said bearing-block so that with the rise and fall of said bearing-block said feed-arms will be rocked to carry the material fed into the press through said feed-openings, substantially as set forth.

7. In a baling-press the combination with a baling-chamber having a compression-chamber at each end thereof, a reciprocating traverser acting alternately in said compression-chambers and a rocking bearing-block in which is mounted the traverser-actuating mechanism, of a feed-chamber provided with feed-openings communicating with said compression-chambers, rocking feed-arms operating in said feed-chamber, and a rock-shaft on which said arms are mounted connected with said bearing-block so that with the rise and fall of said bearing-block said feed-arms will be rocked to carry the material fed into the press alternately through the one and the other of said feed-openings into said compression-chambers, substantially as set forth.

BENJAMIN FRANKLIN MARTINDALE.

Witnesses:
I. K. HILDRETH,
L. M. HOY.